Oct. 8, 1940.     B. BANNISTER     2,216,718
MANUFACTURING METALLIC TUBULAR ARTICLES
Filed Aug. 2, 1937     4 Sheets-Sheet 1
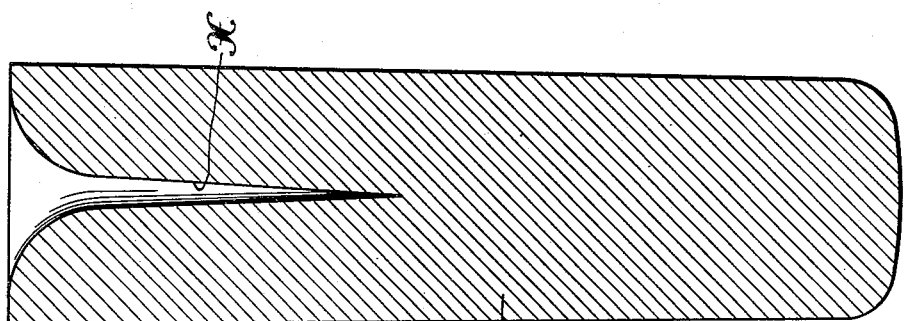
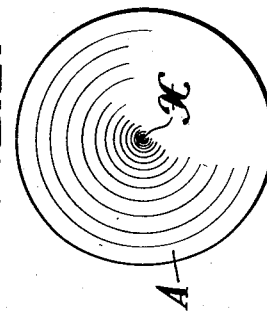
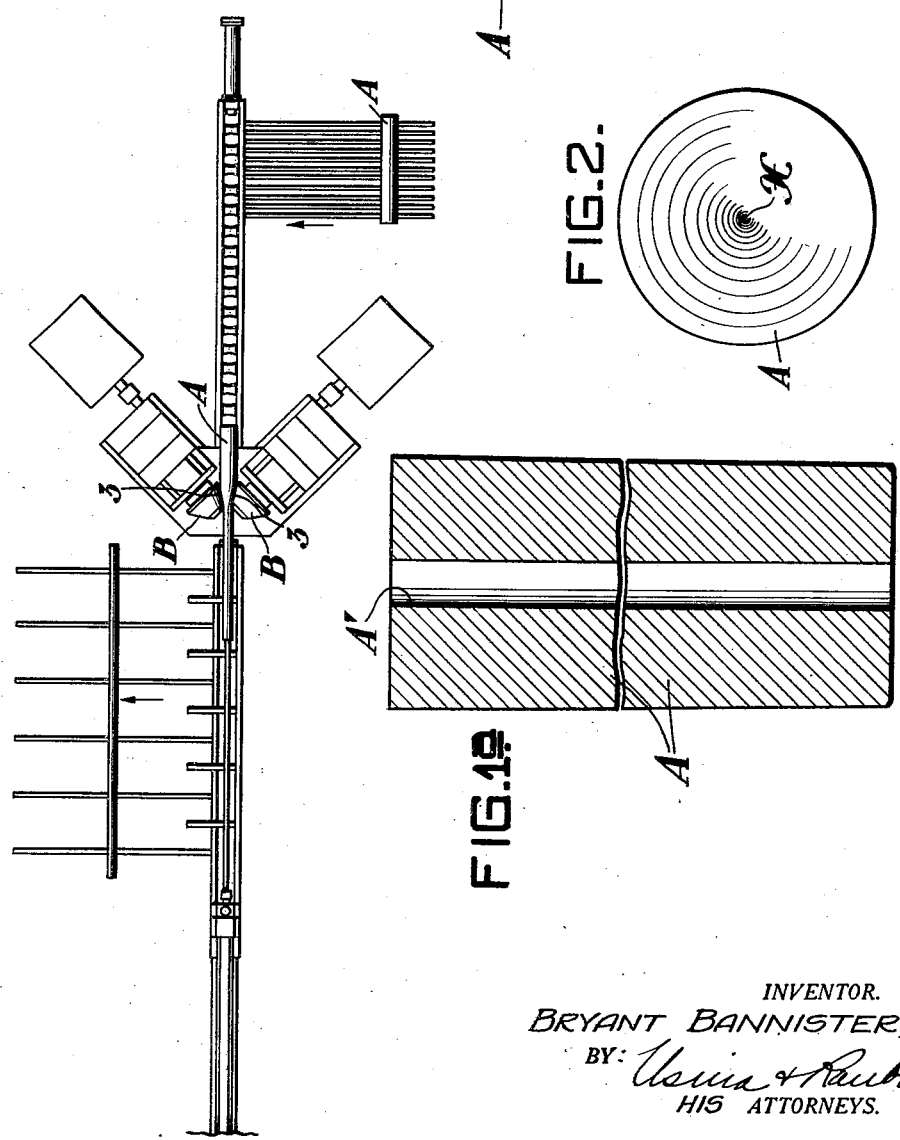
INVENTOR.
BRYANT BANNISTER,
BY:
HIS ATTORNEYS.

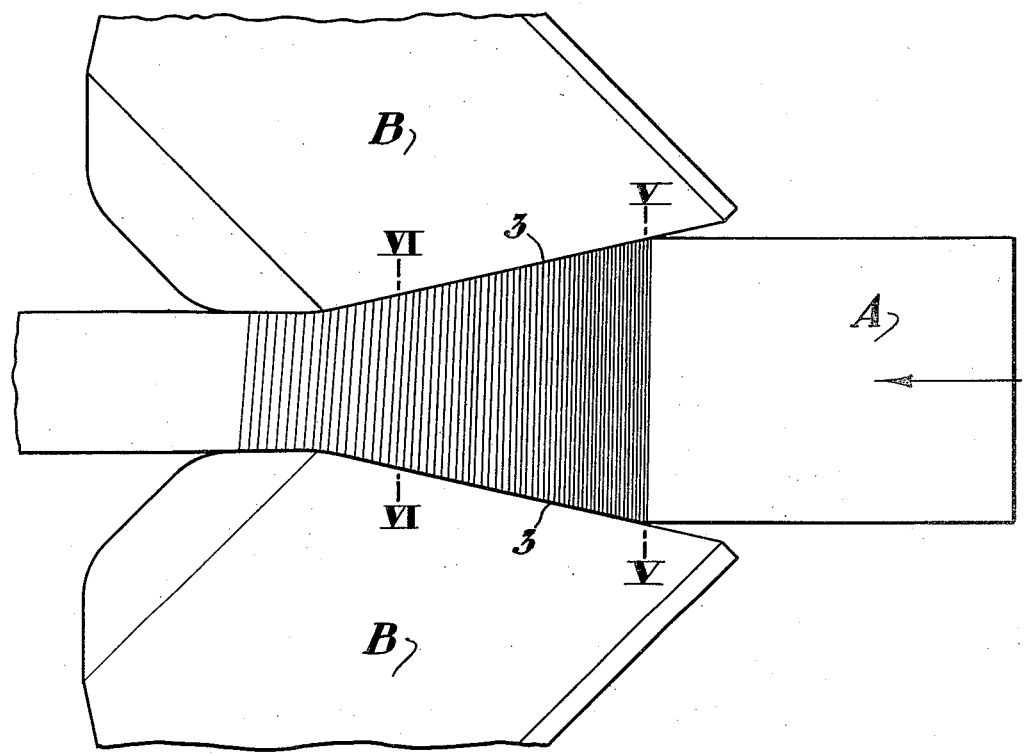
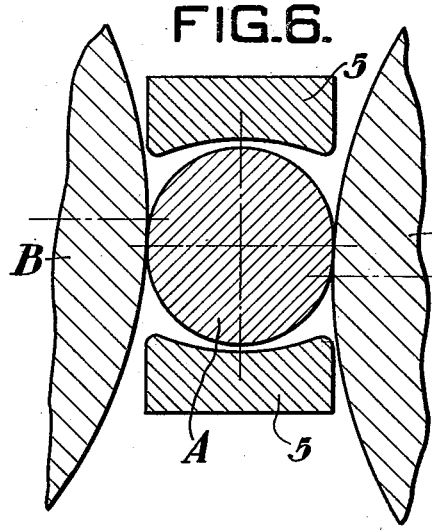
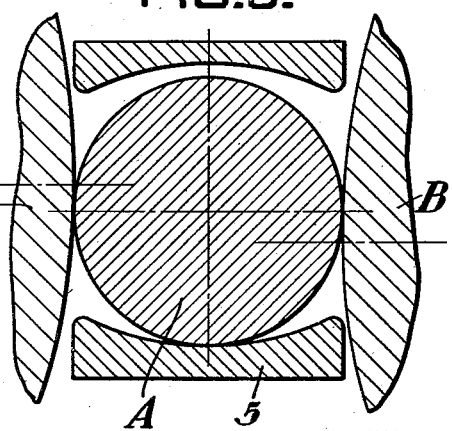

Oct. 8, 1940.   B. BANNISTER   2,216,718
MANUFACTURING METALLIC TUBULAR ARTICLES
Filed Aug. 2, 1937   4 Sheets-Sheet 3

INVENTOR.
BRYANT BANNISTER,
BY Usina & Rauber
HIS ATTORNEYS.

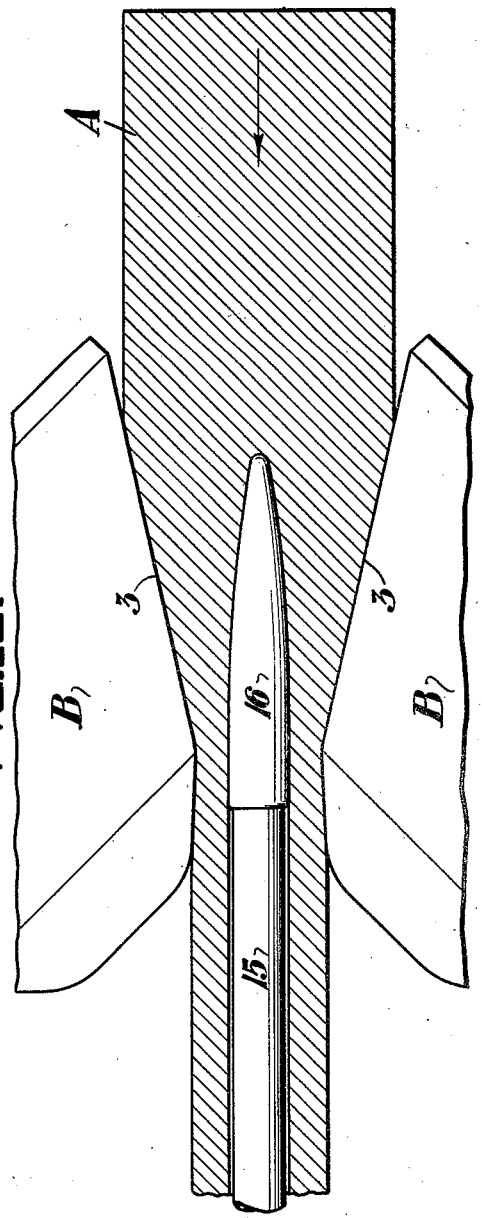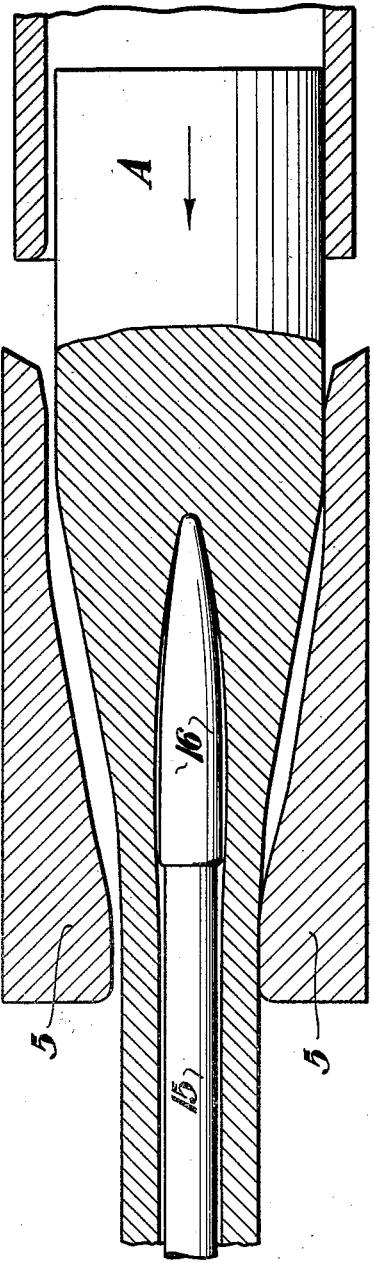

Patented Oct. 8, 1940

2,216,718

UNITED STATES PATENT OFFICE 2,216,718

MANUFACTURING METALLIC TUBULAR ARTICLES

Bryant Bannister, Mount Lebanon, Pa., assignor to National Tube Company, a corporation of New Jersey Application August 2, 1937, Serial No. 157,044

3 Claims. (Cl. 29—156)

This invention relates to the manufacture of metallic tubular articles, and more particularly to seamless pipes and tubes.

The common method of obtaining billets for seamless pipe or tube operations is to cast rectangular ingots which are rolled into square blooms on a blooming mill and then reduced to round solid bars in a bar mill, after which these bars are cut into desired lengths, cooled, and subjected to a skinning or peeling operation to remove scale and surface defects. These bars, or billets are subsequently reheated, pierced and rolled into seamless pipes or tubes in accordance with the usual "seamless" practice. The practice of bottom-casting round bars of a size suitable for fabrication into seamless pipes or tubes (that is, of a size comparable to the rolled rounds or billets above mentioned) has been practiced to some extent. However, this practice is not commercially feasible because of the high casting costs and also because the amount of work done on such small ingots in reducing them to pipes or tubes is not sufficient to remove, or obliterate, the many inherent flaws in a cast steel structure.

The method of casting rectangular ingots and reducing these to square blooms and then rolling them into round bars is objectionable not only because of the high cost of these operations (due to the large number of passes through the blooming and bar mills) but also because of the surface defects caused by the rolling of the square blooms into round bars.

It is among the objects of the present invention to lower the cost of manufacturing pipes and tubes without sacrificing quality.

According to the teaching of the present invention, it is proposed to overcome the disadvantages, previously mentioned by top-casting relatively large cylindrical ingots of a size and weight comparable to the rectangular ingots now used, and reducing such ingots to a cylindrical section of a size suitable for conversion into pipe or tube by the regular seamless mill practice. This method contemplates the usual procedure of stripping the cast ingot while very hot, placing it in a conventional soaking pit and, after it has become properly equalized in temperature, charging it into a helical type of blooming mill where it is advanced helically between rolls which reduce its diameter to a size suitable for seamless mill operations.

In the drawings:

Figure 1 is a sectional elevation of a billet which may be used in performing the method of the present invention;

Figure 1ª is a foreshortened view similar to Figure 1 but disclosing a modified form of billet;

Figure 2 is a plan of the billet of Figure 1;

Figure 3 is a plan of apparatus which may be used to perform the method of the invention;

Figure 4 is an enlarged view of a portion of the apparatus in Figure 3;

Figure 5 is a sectional view on the line V—V of Figure 4;

Figure 6 is a sectional view on the line VI—VI of Figure 4;

Figure 12 is a view similar to Figure 4 but disclosing the billet in section; and Figure 13 is a sectional elevation through the apparatus of Figure 12 but disclosing additional elements thereof.

Figure 7:
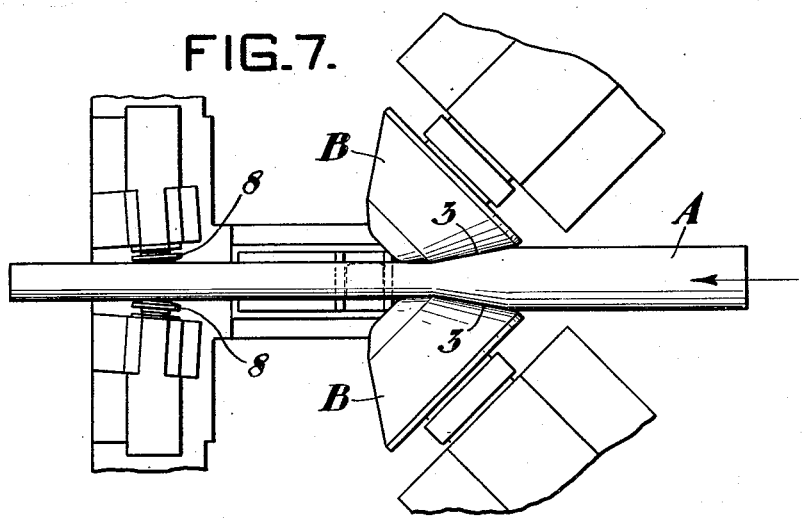
Figures 7 to 11 are details.
Figure 8:
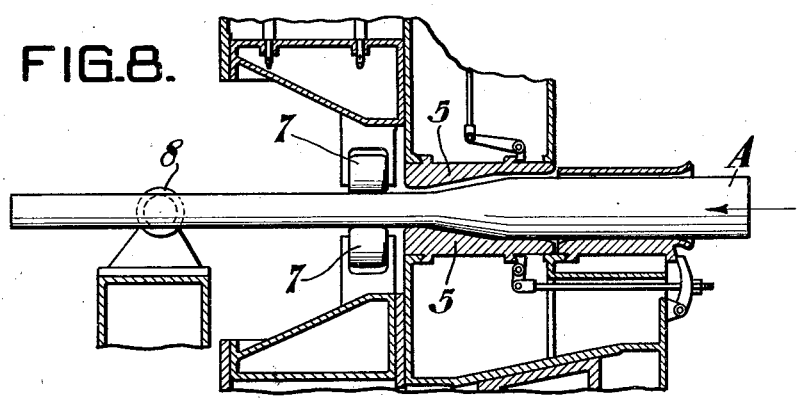

A cylindrical ingot A is preferably top cast and may be either solid, as shown in Figure 1, or provided with a hollow core A', as shown in Figure 1ª. An ingot of relatively large size, comparable in weight to the rectangular ingots now used having a weight sufficient to produce two or more commercial lengths of pipe and of a diameter of at least 16", is contemplated, which, after having its temperature equalized, is reduced in diameter by a single pass through a helical type blooming mill. This reduction is of from between 25 per cent to 80 per cent in diameter; and preferably to a diameter of 12" or 13". The elongation of such a reduction is preferably in the same proportion as the square of the diameter of the entering work-piece is to the square of the diameter of the rolled billet.

A helical type blooming mill is shown in Figure 3 as comprising a pair of suitably driven cone-shaped rolls B, having convergent portions 3 of substantial length. In order to secure a forward feeding effect the rolls B are disposed with their axes of rotation oppositely inclined to each other with respect to a horizontal plane, or the equivalent arrangement whereby the axes of rotation are in parallel planes to each other and parallel to the axis of the work-piece but equi-distant above and below the plane of the axis of the work-piece. The convergent portions 3 of the rolls B are proportioned to maintain a constant rate of rotation of the ingot A as it is advanced and rotated by the rolls B so that it is not twisted while being reduced. As can be readily seen, the working pressures of the rolls B are radial and, with the absence of any twisting tendency, precludes surface tension which causes separation of the grain structure and surface cracks. The angle of divergence of the working surfaces of the rolls from the mean center-line of the pass is such that the amount of reduction per roll contact is sufficiently small to prevent the ingot A from bulging in the plane normal to that in which the rolling pressures are applied. This is necessary in order to prevent tension in the outer surface of the ingot which cannot be avoided in the conventional blooming mill, where heavy reductions per pass are employed with roll pressure on only two sides of the rectangular section. The rate of progression through the helical blooming mill is such that the number of revolutions made by the ingot in the reducing pass (which correspond to passes in a longitudinal mill) and the corresponding number of working contacts with the cone-shaped rolls is much greater than is commercially feasible in the conventional blooming mill where the ingot is rolled in one direction, manipulated, reversed and returned through the rolls in the opposite direction (twenty to thirty passes being the usual number employed). As shown in Figure 4, a large number of "working passes" are feasible in my helical type blooming mill wherein the metal progresses in increments in the nature of a twin screw.

Guides 5 are provided to guide the work-piece into the pass of the rolls B and hold it properly centered while it is being reduced in diameter. At the outlet end of the pass, a pair of idle steadying rolls 7 and a pair of suitably driven pinch rolls 8 are suitably positioned to receive the work-piece as it emerges from the pass of the rolls B. The pinch rolls 8 are designed to assist the rotation and forward movement of the work-piece and are operated at a speed correlated to the ratio of rotation of the work-piece in the pass in order to prevent any twisting thereof after it has been acted upon by the rolls B.

The reduced ingot may be immediately cut to desired billet length by a hot saw and then transported to a "seamless mill" with a substantial portion of the initial heat still retained which would materially reduce the cost of reheating to piercing temperature.

In this type of helical rolling, when the total reduction in section is heavy, there is a tendency to draw the metal away from the center of the work-piece causing a longitudinal aperture therethrough, which, however, may be varying in size and contour. For this reason it may in some instances be desirable to provide the mill with a thrust bar 15 and piercing point 16, as shown in Figures 12 and 13, which would cause the aperture opened in the ingot to be smooth and concentric with the center thereof. If the ingot is cast with a hollow center, as shown in Figure 1ª, it will not be necessary to use a thrust bar and piercing point unless it is desired to enlarge the opening and dispense with the regular first piercing operation.

Figure 9:
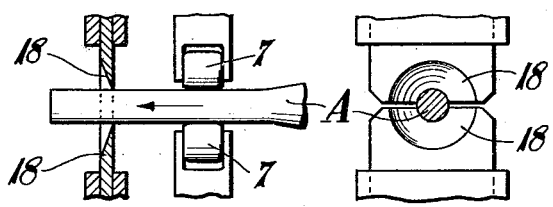
Figure 10:
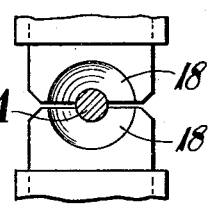
Figure 11:
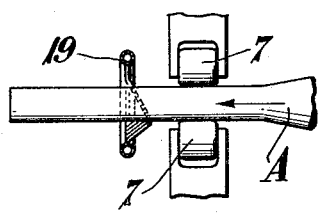

An auxiliary feature of the helical mill is shown in Figure 9, wherein scraping knives 18 are positioned at the outlet of the mill so as to remove the outer surface of the round. As an alternative, oxy-acetylene torches 19 (Figure 11) may be provided at this point to accomplish the same result. This operation would correspond to what is now termed the "peeling operation," performed on conventional rounds after they have cooled to atmospheric temperature. In most cases, however, this conditioning operation would be unnecessary due to the improved surface quality obtained by my method.

It will be readily seen that inasmuch as the final product is a cylindrical section, my invention permits starting with a cylindrical section, and transforms it from a solid, or substantially solid, section to the finished cylindrical product. This, as can be readily seen, will materially reduce the strains to which the metal is subjected by the conventional practice of casting a rectangular section, reducing the rectangular section and then transforming the rectangular section to a round.

Further, by starting with a cylindrical ingot, advantage can be taken of the better surface of a cylindrical casting and freedom from defects which originate during the solidification of rectangular ingots. Another important advantage of the cylindrical ingot is that the so-called "pipe" (X) is geometrically in the axial center of the casting, which permits the metal surrounding this "pipe" to be rolled into usable product. This cannot be done when rectangular ingots are bloomed, as the "pipe" in the rolled section is not circular and, therefore, not equidistant from the surface of the round. Therefore, it is not necessary to crop as large a percentage of the cylindrical ingots as of the conventional rectangular ingots. This results in material increase in percentage of the usable portion of the ingot.

While I have shown and described several specific embodiments of my invention, it will be understood that I do not wish to be limited exactly thereto, since various modifications may be made without departing from the scope of my invention, as defined by the following claims.

I claim:

1. The method of manufacturing metallic tubular articles which comprises casting a commercial-sized ingot of substantial circular cross-section, substantially reducing the overall diameter of said ingot by a helical rolling operation whereby it is bloomed, and performing a tube-rolling operation on the bloomed ingot whereby a metallic tubular article of the desired size is obtained.

2. The method of manufacturing metallic tubular articles which comprises casting a commercial-sized ingot of substantial circular cross-section, substantially reducing the overall diameter of said ingot by a helical rolling operation whereby it is bloomed, and performing a tube-rolling operation on the bloomed ingot, said last-named operation being conducted while forcing the commercial-sized ingot over an interiorly disposed mandrel whereby a tubular work-piece is obtained.

3. The method of manufacturing metallic tubular articles which comprises casting a commercial-sized ingot of substantial circular cross-section, substantially reducing the overall diameter of said ingot by a helical rolling operation whereby it is bloomed, and performing a tube-rolling operation on the bloomed ingot whereby a metallic tubular article of the desired size is obtained, said blooming operation being regulated to obtain a reduction in the overall diameter of said ingot of at least 20 per cent.

BRYANT BANNISTER.